US010293265B1

(12) United States Patent
Freedman et al.

(10) Patent No.: US 10,293,265 B1
(45) Date of Patent: May 21, 2019

(54) SYSTEMS AND METHODS FOR A SPHERE RIDE

(71) Applicant: Universal City Studios LLC, Universal City, CA (US)

(72) Inventors: Daniel Matthew Freedman, Ocoee, FL (US); Ji Hyun Han, Winter Park, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/806,053

(22) Filed: Nov. 7, 2017

(51) Int. Cl.
*A63G 29/02* (2006.01)
*A63G 31/00* (2006.01)
*G06F 3/147* (2006.01)
*G02B 27/01* (2006.01)

(52) U.S. Cl.
CPC ......... *A63G 29/02* (2013.01); *G02B 27/0101* (2013.01); *G02B 2027/014* (2013.01); *G06F 3/147* (2013.01)

(58) Field of Classification Search
CPC .......... A63G 7/00; A63G 31/00; A63G 31/02; A63G 31/04; A63G 31/06; A63G 31/08; A63G 31/16; G09B 9/00; G09B 9/12
USPC ............. 472/47, 59–61, 134; 434/29, 34, 55
See application file for complete search history.

(56) References Cited

U.S. PATENT DOCUMENTS

| | | | | |
|---|---|---|---|---|
| 4,856,771 A * | 8/1989 | Nelson | ................... | A63G 31/16 434/34 |
| 5,052,932 A * | 10/1991 | Trani | ....................... | G09B 9/12 434/29 |
| 5,060,932 A | 10/1991 | Yamaguchi | | |
| 5,489,212 A * | 2/1996 | Yoshimoto | ............. | A63G 31/16 434/34 |
| 5,678,889 A | 10/1997 | Percell, Jr. | | |
| 6,017,276 A | 1/2000 | Elson et al. | | |
| 6,024,647 A | 2/2000 | Bennett et al. | | |
| 6,053,576 A | 4/2000 | Jessee | | |
| 6,095,926 A * | 8/2000 | Hettema | ................. | A63G 31/16 104/85 |
| 6,354,954 B1 | 3/2002 | Sumner | | |
| 6,796,908 B2 * | 9/2004 | Weston | .................... | A63G 7/00 434/55 |

(Continued)

FOREIGN PATENT DOCUMENTS

| | | |
|---|---|---|
| BE | 899 473 A | 10/1984 |
| EP | 1882504 A1 | 1/2008 |

(Continued)

OTHER PUBLICATIONS

International Search Report dated Jan. 29, 2019 in International Application No. PCT/US2018/059187.

*Primary Examiner* — Kien Nguyen
(74) *Attorney, Agent, or Firm* — Fletcher Yoder, P.C.

(57) ABSTRACT

A ride vehicle includes a base configured to move through an attraction environment and a sphere engaging the base and further including one or more ride seats disposed within the sphere. The one or more ride seats are coupled to an upper surface of a platform disposed within the sphere. The ride vehicle also includes a sphere drive system of the base configured to engage with an external surface of the sphere to rotate the sphere relative to the base. The upper surface of the platform is configured to remain substantially horizontal while the sphere drive system rotates the sphere.

23 Claims, 7 Drawing Sheets

(56) References Cited

U.S. PATENT DOCUMENTS

| | | |
|---|---|---|
| 2008/0300730 A1 | 12/2008 | Cleary |
| 2014/0087334 A1 | 3/2014 | Schlusselberger |
| 2016/0317942 A1 | 11/2016 | Li et al. |
| 2016/0325201 A1 | 11/2016 | Li et al. |

FOREIGN PATENT DOCUMENTS

| | | |
|---|---|---|
| WO | 2007044708 A2 | 4/2007 |
| WO | 2009092452 A1 | 7/2009 |
| WO | 2012016416 A1 | 2/2012 |

* cited by examiner

SYSTEMS AND METHODS FOR A SPHERE RIDE

FIELD OF DISCLOSURE

The present disclosure relates generally to the field of amusement parks. More specifically, embodiments of the present disclosure relate to methods and equipment used in conjunction with amusement park games or rides.

BACKGROUND

Since the early twentieth century, amusement parks (or theme parks) have substantially grown in popularity. One type of amusement park attraction may consist of a ride vehicle which travels along a track. In certain attractions, the ride vehicle may have various decorations or pseudo features to make a user feel as though they are traversing through the amusement park attraction within an alternative vehicle. For example, the ride vehicle may be adorned with ornamental features to resemble a space ship, a train, an animal, an automobile, etc. in an attempt to enhance the user's experience and immerse the user within a theme of the amusement park attraction.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a ride vehicle includes a base configured to move through an attraction environment and a sphere engaging the base and further including one or more ride seats disposed within the sphere. The one or more ride seats are coupled to an upper surface of a platform disposed within the sphere. The ride vehicle also includes a sphere drive system of the base configured to engage with an external surface of the sphere to rotate the sphere relative to the base. The upper surface of the platform is configured to remain substantially horizontal while the sphere drive system rotates the sphere.

In another embodiment, a method includes receiving a load configuration signal, actuating a door of a spherical cabin of a ride vehicle to an open position based on the received load configuration signal, and rotating an outer turntable of a platform relative to an inner turntable of the platform based on the received load configuration signal. The platform is disposed within the spherical cabin. The method also includes receiving one or more passengers within the spherical cabin of the ride vehicle after receiving the load configuration signal, receiving the ride configuration signal, rotating the outer turntable relative to the inner turntable based on the received ride configuration signal, and actuating the door of the ride vehicle to a closed position based on the received ride configuration signal.

In another embodiment, a ride vehicle includes a sphere cabin configured to be rotated by a sphere drive system. The sphere drive system comprises a plurality of drivers configured to transfer rotational motion to the sphere cabin such that the sphere cabin is capable of being rotated in all directions about its center. The ride vehicle also includes one or more platforms configured to support one or more users within the sphere cabin. Further, the sphere cabin is configured to rotate relative to the one or more platforms.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
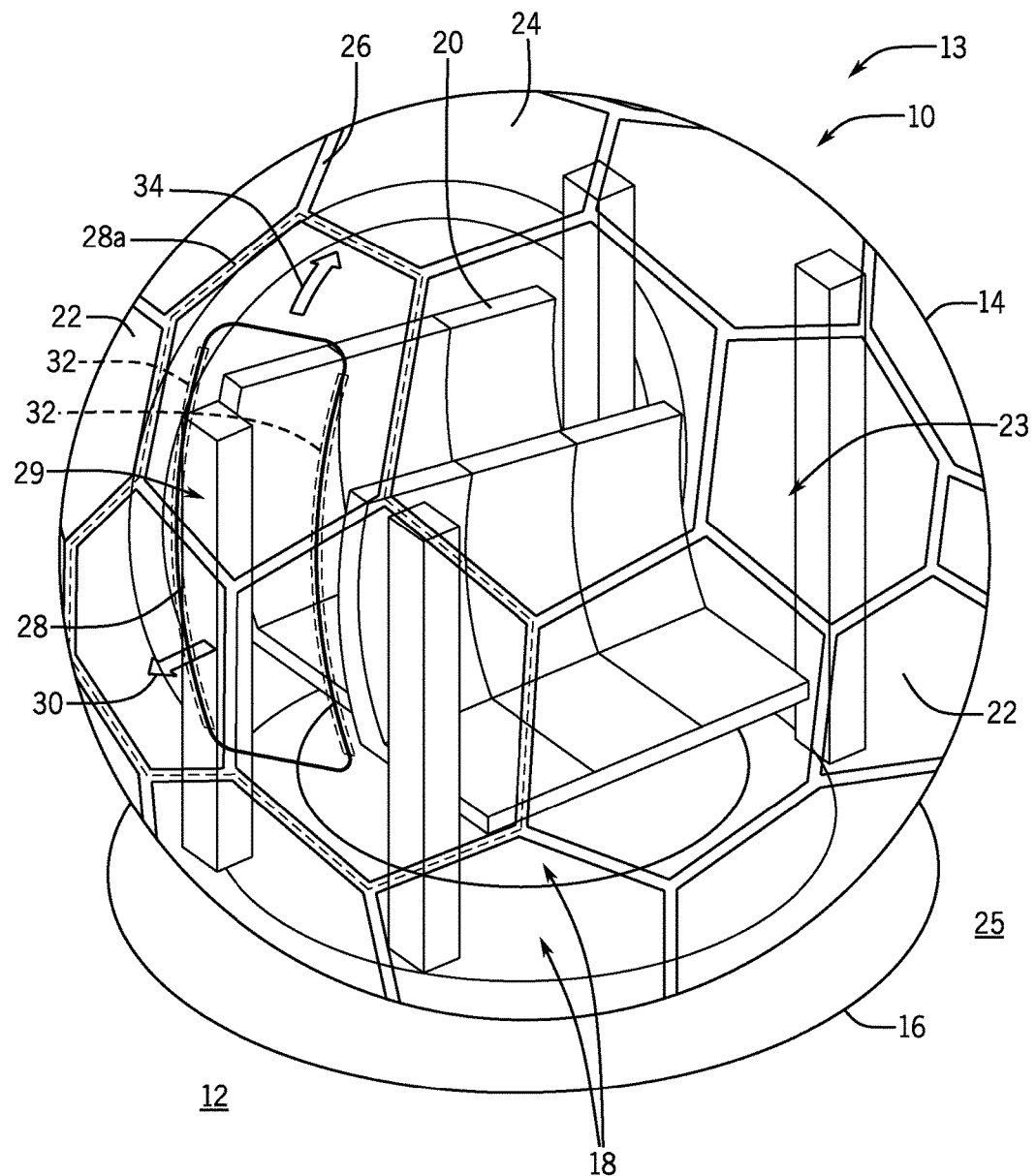
FIG. 1 is a perspective view of a ride vehicle, in accordance with an embodiment.

The present disclosure provides a system and method for encompassing users of a ride vehicle within a ride cabin configured as a rotating and translating sphere that, in operation, maintains the position of the users even as a portion of the vehicle rotates. That is, in certain embodiments, while the sphere of the vehicle rotates about the users, the users do not rotate but are nonetheless moved along the ground. In this manner, the users may feel as though they are traveling within a ball as it rolls along the ground.

For certain types of theme rides, a ride vehicle may include various features in an attempt to enhance an immersive experience for a user. For example, the ride vehicle may include various non-functional elements such as steering wheels, wings, buttons, boosters, rockets etc. to make the user feel as though they are being propelled by a means other than standard ride vehicle along a conventional track system or that is otherwise driven under control of the ride system. However, a typical user may be distracted by these non-functional elements if they do not appear to enhance the operation of the vehicle, resulting in an unsatisfactory experience for the user.

In certain embodiments, amusement park rides such as track-based rides, autonomous vehicle rides, or open-terrain rides are provided that will encompass a user in a sphere configured as a spherical shell defining an interior user space or cabin. Specifically, a ride vehicle may include a sphere that is at least in part translucent and that rotates about the user such that the user feels as though the sphere is rolling through the amusement park ride. Although not visible to the user positioned within the sphere, the ride vehicle may include a base that transports the sphere through the amusement park ride. In certain embodiments, the base may be configured to move along a predetermined path (e.g., via a track) and/or may include a set of wheels that may enable the ride vehicle to move through a variety of terrain with various elevations. Accordingly, the ride vehicle may include a sphere, such as a spherical shell, that is configured to rotate about a platform or turntable that accommodates user seats and/or rests. Both the platform and the sphere may be translated together via a base positioned on an exterior of the spherical shell. The sphere is positioned between the base and the platform and is configured to rotate relative to both in operation. Accordingly, the ride vehicle may include one or more components between the sphere and the base and/or between the sphere and the platform to permit such rotation (e.g., one or more roller or roller bearing systems). The rotation may be in any direction and/or at a rotational velocity that is consistent with the translational velocity of the ride vehicle such that users within the sphere perceive the sphere to be rolling along a floor through the amusement park ride. Further, the platform may be configured to operate independently of the sphere, such that the users within the sphere do not rotate together with the sphere. In certain embodiments, the platform is configured to rotate the user independently along a separate plane. For example, the users may rotate in a left or rightward direction.

With the foregoing in mind, FIG. 1 illustrates an embodiment of a ride vehicle 10 within an attraction environment 12 of a theme park ride 13. The ride vehicle 10 may include a sphere 14, a base 16, one or more platforms 18, e.g., turntables, one or more user seats 20 (or user rests), and one or more theme elements 22. As used herein, the terms, "sphere" or "spherical", may not be technical or precise geometric terms. For example, objects described as spheres, or spherical in shape, may include portions that are substantially rectilinear.

The sphere 14 may be configured as a spherical shell or hollow spherical shape that accommodates one or more users (e.g., ride passengers) within an interior space 23. In certain embodiments, the sphere 14, when closed or in operation, is a continuous sphere shape. In other embodiments, the sphere 14 may include gaps or windows to the exterior space 25. In one embodiment, the sphere 14 may be composed of a plurality of panels 24 coupled together via a frame 26. In the depicted embodiment, the panels 24 and the frame 26 form a honeycomb pattern to make up the sphere 14. For example, each panel 24 may be in the shape of a hexagon that matches the overall curvature of the sphere 14. In some embodiments, however, the panels 24 and the frame 26 may be in various shapes such as triangles, squares, pentagons, etc. For example, the panels 24 and the frame 26 may be a combination of shapes such as pentagons and triangles, or pentagons and hexagons. Further, each panel 24 may be the same size and shape to permit compatibility with replacement panels 24. In other embodiments, each sphere 14 may include a mix of panel shapes and/or sizes. Regardless, each panel 24 may be rigid and of adequate thickness to provide support to the ride vehicle 10. Further, in some embodiments, the frame 26 may be a pre-formed structure such that the panels 24 fit into the frame 26 utilizing press-fitting, epoxy, resin, locking mechanisms, latches, or any combination thereof. In certain embodiments, the panels 24 may be easily removable from the sphere 14. For example, the panels 24 may experience wear (e.g., scratching, scuffing, etc.) and individual panels 24 may be removed for replacement and/or refurbishing while unworn panels 24 may remain in place, reducing refurbishing costs. In some embodiments, each panel 24 may be glued and/or coupled together without a separate frame. Indeed, in such embodiments, the frame 26 may be formed from the coupling (e.g., epoxy) between adjacent panels 24. Each panel 24 may also couple to the frame 26 such that sphere 14 has a smooth and flush surface and is substantially translucent. Particularly, each panel 24 may be composed of a rigid and transparent or translucent material such as glass or plastic. However, in certain embodiments, the panels 24 may be formed from a material that is capable of changing a level of transparency (e.g., switchable glass that changes in transparency based on application of voltage, light, or heat). Further, in certain embodiments, only some of the plurality of panels 24 may be transparent/translucent. In some embodiments, the frame 26 may also be composed of a rigid and transparent or translucent material. Additionally, or in the alternative, the frame 26 may be composed of a rigid, and substantially opaque material such as a metal.

The sphere 14 may also include a door 28 that opens to allow users to enter and exit the ride vehicle 10 through a portal 29 (e.g., doorway). Similar, to the panels 24, the door 28 may be curvilinear such that it matches the curvature of the sphere 14. Indeed, when the door 28 is closed, the door 28 may form a substantially flush surface with the sphere 14. Further, it is to be understood that the door 28 may be of any suitable shape. For example, as shown in the current embodiment, the door 28 may be substantially rectangular in shape, which may have filleted corners, similar to a door of a fuselage of an aircraft. In some embodiments, as indicated by 28a, a perimeter of the door 28 may substantially match a pattern of the frame 26 such that the perimeter of the door 28 does not traverse through one of the panels 24.

Furthermore, as mentioned above, the door 28 may open and close to allow users to enter and exit the ride vehicle 10 through the portal 29. To open, the door 28 may first move in a radial direction relative to the center of the sphere 14, as generally indicated by arrow 30, such that the door is radially a distance beyond the surface of the rest of the sphere 14. Once radially beyond the surface of the rest of the sphere 14, the door 28 may utilize one or more rail systems 32 to move circumferentially and/or tangentially relative to the center of the sphere 14, as generally indicated by arrow 34. When closing, the door 28 may first move opposite to the arrow 34 and then opposite to the arrow 30. The one or more rail systems 32 may support the door 28 as the door 28 opens or closes and moves along the one or more rail systems 32 in the circumferential/tangential direction (e.g., arrow 34). In some embodiments, the one or more rail systems 32 may include telescoping segments that extend to support the door 28 while opening or closing. In some embodiments, the rail system 32 may be integrated (e.g., rigidly coupled) with the sphere 14. Additionally, or in the alternative, the door 28 may utilize hinges to open and close.

The ride vehicle 10 may also include the one or more theme elements 22, which may be implemented as interior and/or exterior structures and that may serve to enhance a thrill factor of a user of the ride vehicle 10. Therefore, the theme elements 22 may be shaped in accordance with a theme of the attraction environment 12. For example, the theme elements 22 may be generally circular, triangular, rectangular, pentagonal, hexagonal, etc. in shape. In addition, or alternative to shapes, the theme elements 22 may be in the form of various objects such as shields, turrets, additional seats 20, electronic systems (e.g., radar systems, targeting systems, media displays, etc.), or other objects that may enhance an experience of a user. Regardless, as shown in the current embodiment, the theme elements 22 may be located on generally opposite sides (e.g., left and right sides) of the seats 20 as shown. Indeed, one or more of the theme elements 22 may be located adjacent to the portal 29 through which users may enter and exit the ride vehicle 10. Particularly, as users enter/exit the ride vehicle 10, the users may enter and exit through the portal 29 in a direction generally perpendicular to a direction that the seats 20 are facing. Accordingly, in their current position, the theme elements 22 may obstruct a path of users through the portal 29 as the users enter and exit the ride vehicle 10. For example, in the depicted embodiment, the theme elements 22 are struts that are positioned to block the portal 29.

The theme elements 22 may be rotated about the center of the sphere 14 and relative to the door 28, the portal 29, and the seats 20 such that the theme elements 22 are rotated out of a path of users as they enter and exit the ride vehicle 10. To this end, the ride vehicle 10 may include one or more turntables to enable the rotation of the theme elements 22 relative to the portal 29 as well as the seats 20. Particularly, referring now in parallel to FIG. 2, which is a lateral cross-sectional view of the ride vehicle 10, the ride vehicle 10 may include an inner platform or turntable 36 and an outer turntable 38. The seats 20 may be coupled to the inner turntable 36 and the theme elements 22 may be coupled to the outer turntable 38. Particularly, the theme elements 22 may be coupled (e.g., bolted and/or welded) to the outer turntable 38 via a connection 39. The ride vehicle 10 may further include inner roller bearings 40 disposed between the inner turntable 36 and the outer turntable 38, which may provide for substantially free movement of the inner turntable 36 relative to the outer turntable 38. The ride vehicle 10 may also include outer roller bearings 48, or any other suitable friction-reducing mechanisms, disposed between the outer turntable 38 and an internal surface 50 of the sphere 14. Indeed, the outer turntable 38 may be contoured to substantially match the contour of the internal surface 50. Particularly, the inner turntable 36 may rotate within a substantially horizontal plane within the outer turntable 38. To this end, the inner turntable 36 may include a lip 41 disposed within an inset 43 of the outer turntable 38. Engagement of the lip 41 of the inner turntable 36 with the inset 43 of the outer turntable 38 may ensure that an inner top surface 45 of the inner turntable 36 and an outer top surface 47 of the outer turntable 38 remain substantially within the same plane (e.g., a horizontal plane). In this manner, the inner turntable 36 may be rotated relative to the outer turntable 38 such that the theme elements 22 are rotated out of a path (e.g., between the portal 29 and the seats 20) of users 53 as they enter/exit the vehicle 10. In some embodiments, ride operators of the theme park ride 13 may manually rotate the theme elements 22 and/or rotate the outer turntable 38 to displace the theme elements 22 from the path of the users 53 exiting or entering the ride vehicle 10. In some embodiments, as discussed further below, the ride vehicle 10 may utilize a turntable motor 49 to rotate the theme elements 22 and the outer turntable 38. Further, in some embodiments, the inner turntable 36 may be removable from the outer turntable 38, which is also removable from the ride vehicle 10. Indeed, in some embodiments, the turntable 36 or the turntable 38 may be formed of multiple sections, thereby providing for easy removal. Further, the removability of the turntable 36 or the turntable 38 may provide for an operator to perform maintenance (e.g., cleaning) of the turntable 36 or the turntable 38, the roller bearings 40, 48, and/or the sphere 14.

The ride vehicle 10 may also include a drive system 42 (e.g., spherical drive system, spherical induction system, tire drive system), which may rotate the sphere 14 via a plurality of drivers 44 (e.g., tires, spherical induction motors, spheres), depicted as three or more drivers 44. Particularly, in some embodiments, the drivers 44 may be tires, substantially toroidal in shape, which may contact the external surface 55 of the sphere 14 as they rotate. In such embodiments, each of the drivers 44 may rotate in separate and distinct rotational planes thereby rotating the sphere 14 in any direction, which is a result of a combination of the distinct rotational planes of the drivers 44. Further, although each driver 44 may rotate in a singular respective rotational plane, each driver 44 may also include additional rotational elements disposed about a surface of each driver 44 that provide for rotation of the sphere 14 in a direction that is substantially perpendicular to the respective rotational plane of each driver 44. In particular, the rotational elements may be disposed about an annular axis of each driver 44 and are configured to rotate about the annular axis. For example, while the sphere 14 rotates in a direction that is a combination of the rotational planes of the drivers 44, the direction that the sphere 14 rotates may not be aligned with the rotational plane of one or more of the drivers 44. Therefore, the additional rotational elements of the particular driver 44 may reduce frictional resistance, or drag, of the particular driver 44 on the sphere 14 as the sphere 14 rotates in a direction that is not aligned with the rotational plane of the particular driver 44. In some embodiments, each driver 44 may be driven by one or more motors.

Furthermore, in some embodiments, each of the drivers 44 may include a ball (e.g., a sphere) driven by a spherical induction motor. Particularly, each driver 44 may be a rotor (e.g., the ball) driven by three or more stators via induction. For example, each driver 44 may include a three-degrees-of-freedom induction motor that may rotate the ball in any direction. In such embodiments, the driver 44 may include a portion of the ball that is in contact with the external surface 55 the sphere 14. Therefore, as the individual drivers 44 rotate, the sphere 14 may rotate in a direction that is a combination of the rotation of the individual drivers 44, thereby enabling rotation of the sphere 14 in any direction about a center of the sphere 14. Regardless of the form of the drivers 44 or the motive of rotation of the drivers 44, the drivers 44 may contact the external surface 55 of the sphere 14 within a plane 52. Particularly, the plane 52 may be disposed about a lower portion of the sphere 14. However, the exact location of the plane 52 on the sphere 14 may be a function of the weight of the sphere 14. For example, the greater the weight of the sphere 14, the lower the points of contact (e.g., the plane 52) of the drivers 44 may be on the sphere 14. Indeed, in some embodiments, the sphere 14 may include additional weights. The additional weights may serve to increase the weight of the sphere 14 as well as help to evenly distribute weight about the sphere 14. In some embodiments, the sphere 14 may also be supported by auxiliary supports 37, which may support at least a portion of the weight of the sphere 14. Indeed, the auxiliary supports 37 may include friction reducing elements (e.g., roller bearings) that may contact the external surface 55 of the sphere 14, thereby enabling substantially free rotation of the sphere 14 relative to the auxiliary supports 37.

As the sphere 14 rotates (e.g., via contact with the drive system 42), the outer turntables 38 and the outer roller bearings 48 may enable the inner and outer top surfaces 45, 47 of the inner and outer turntables 36, 38 to remain in a substantially horizontal position. In this manner, the users 53 disposed within the seats 20 of the ride vehicle 10 may remain in a substantially upright position while the sphere 14 rotates relative to the users 53. For example, the outer roller bearings 48 may contact the internal surface 50 of the sphere 14, thereby enabling the rotation of the sphere 14 relative to the outer turntable 38, and by extension, the inner turntable 36 and the seats 20 as well. Indeed, the weight of the platforms 18, the seats 20, the users 53, and the theme elements 22 may ensure that the platforms 18 are biased towards a position in the bottom (e.g., lower hemisphere) of the sphere 14. In some embodiments, while the sphere 14 is rotating relative to the platforms 18 and the users 53, the platforms 18 and the users 53 may be prone to horizontally rotating (e.g. migrating) in orientation (e.g., due to variable resistances within the sphere 14). Accordingly, in such embodiments, the ride vehicle 10 may include one or more steering mechanisms 61 configured to keep the users 53 and the platforms 18 facing a particular direction (e.g., a forward direction). To properly orient the platforms 18 and/or the users 53, the steering mechanisms 61 may utilize one or more friction elements and/or rotational elements to interact with the internal surface 50 of the sphere 14 and the outer turntable 38.

In some embodiments, the platforms 18, the seats 20, and by extension, the users 53, may rotate in conjunction with the rotation of the sphere 14. For example, in some embodiments, the ride vehicle 10 may include a locking system 57 configured to prevent movement of the sphere 14 relative to the one or more platforms 18. That is, the locking system 57 may include one or more locking features 59 configured to lock the inner turntable 36 with the outer turntable 38, lock the outer turntable 38 with the sphere 14, lock the inner turntable 36 with the sphere 14, or any combination thereof. In some embodiments, the locking feature 59 may be a latch or other device configured to lock the top surfaces 45, 47 of the platforms 18 together. Additionally or alternatively, the locking feature 59 may include a bolt and one or more bolt receptacles disposed within the platforms 18 configured to prevent rotation of the inner turntable 36 relative to the outer turntable 38. Further, in some embodiments, the locking feature 59 may be a compression device configured to engage the platforms 18 with the internal surface 50 of the sphere 14. In such embodiments, the locking feature 59 may extend between and engage with the platforms 18 and the internal surface 50 of the sphere 14, thereby delivering a compressive force to the locking feature 59 to prevent rotation of the sphere 14 relative to the platforms 18.

As mentioned above, the base 16 may support the sphere 14 as the ride vehicle 10 traverses the attraction environment 12 and may be positioned below the sphere 14 and/or between the sphere 14 and the attraction floor 51. Therefore, the base 16 may include wheels 60 that contact and roll along a floor 51 of the attraction environment 12. In some embodiments, the ride vehicle 10 may include three, four, or any other suitable number of wheels 60. Additionally, or in the alternative, the ride vehicle 10 may move along a track of the attraction environment 12. Accordingly, in some embodiments, the base 16 may include one or more track-compatible systems (e.g., one or more track guides, a bogie system, etc.) to enable movement of the ride vehicle 10 along the track. The base 16 may further include a suspension system 62 to provide a smooth ride for the users 53 as they progress through the attraction environment 12 within the ride vehicle 10. To this end, the suspension system 62 may utilize any suitable shock absorption mechanisms such springs/coils and/or hydraulic suspensions, other damping systems, or any combination thereof. In some embodiments, the suspension system 62 may be similar to an automobile suspension system such as a leaf spring suspension, a torsion beam suspension, or a coil spring suspension. Particularly, in some embodiments, the suspension system 62 may couple the wheels 60 to the sphere drive system 42. In this manner, if the ride vehicle 10 traverses a sudden change in elevation (e.g., a pothole, a step, an object, etc.) of the attraction environment 12, a minimal amount of reaction force will be transferred to the sphere 14. Indeed, because the sphere 14 may be at least partially supported by the sphere drive system 42, the suspension system 62 may reduce reaction forces experienced by the sphere 14, thereby ensuring that the sphere 14 substantially remains in contact the with the sphere drive system 42. Further, in some embodiments, the ride vehicle 10 may travel through the attraction environment 12 via input of a ride vehicle motor 68. For example, the ride vehicle motor 68 may drive rotation of the wheels 60 to motivate the ride vehicle 10 along the floor 51 of the attraction environment 12.

The ride vehicle 10 may also include a housing 70, or compartment, within the inner turntable 36 that may house various systems of the ride vehicle 10. For example, the housing 70 may include a sound system 72, a special effects system 74, a sphere controller 76, a lighting system 77, a power source 78, and the turntable motor 49. The housing 70 may be \accessible through a hatch 80 disposed within the inner top surface 45. In some embodiments, the seats 20 may be removable to provide for easier access to the hatch 80 and/or for maintenance of the ride vehicle 10. The sound system 72 may provide audio in accordance with a theme, or narrative, of the attraction environment 12. For example, the sound system 72 may emit animal and/or environmental noises. Similarly, the special effects system 74 may provide various special effects in accordance with the theme, or narrative, of the attraction environment 12. For example, the special effects system 74 may emit smog/smoke/vapor that may surround the users 53 within the ride vehicle 10. The special effects system 74 may also include various vibration effects, air effects, fluid effects, etc. that also may enhance an experience of the user 53. The lighting system 77 may supply various lighting effects to the sphere 14 in accordance with the theme, thereby further enhancing the experience of the users 53. Further, the power source 78 may be any suitable power source such as a battery or a generator. The power source 78 may supply power to various components of the ride vehicle including, for example, the sound system 72, the special effects system 74, the sphere controller 76, the lighting system 77, other systems of the ride vehicle 10, or any combination thereof. In some embodiments, the ride vehicle 10 may include an air conditioning unit 79, which may circulate and condition (e.g., cool, heat, remove moisture, etc.) air within the sphere 14 of the ride vehicle 10.

The sphere controller 76 may control certain features of the ride vehicle 10. The sphere controller 76 may be any device employing a processor 81 (which may represent one or more processors), such as an application-specific processor. The sphere controller 76 may also include a memory device 82 for storing instructions executable by the processor 81 to perform methods and control actions described herein relating to the ride vehicle 10. The processor 81 may include one or more processing devices, and the memory device 82 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 81 or by any general purpose or special purpose computer or other machine with a processor.

The sphere controller 76 may be communicatively coupled to a ride controller 84. The ride controller 84 may utilize a processor 86 and a memory device 88, which may be similar to the processor 81 and the memory device 82, respectively, of the sphere controller 76. Particularly, a ride operator may control various functions/elements of the ride vehicle 10 through one or more input devices 91 (e.g., buttons, knobs, touch screens, user interface, etc.) of the ride controller 84. For example, the ride operator may send an operation signal through the input device 91 of the ride controller 84 to the sphere controller 76 to enable operations of the ride vehicle 10. In some embodiments, the ride vehicle 10 may travel autonomously (e.g., without user 53 input) through the attraction environment 12 via input from the sphere controller 76 and/or the ride controller 84. However, in some embodiments, the user 53 may utilize an input device (e.g., a steering wheel) to direct the ride vehicle 10 through the attraction environment 12.

As the ride vehicle 10 moves through the attraction environment 12, the sphere 14 may correspondingly rotate about the users 53, which may give the impression that the sphere 14 is contacting (e.g., rolling along) the floor 51 of the attraction environment 12. Particularly, the tangential speed of the external surface 55 of the sphere 14 may substantially match the velocity of the ride vehicle 10 across the floor 51 of the attraction environment 12. To this end, the ride vehicle 10 may include one or more various sensors 87 (e.g., translational speed sensors, rotational speed sensors, hall-effects sensors, eddy-current sensors, accelerometers, gyroscopes, global positioning system sensors, speedometer etc.). For example, one of the sensors 87 may measure/detect a rotational speed of the sphere 14 and/or the tangential speed of the external surface 55 of the sphere 14 and one of the sensors 87 may measure/detect a speed (e.g., translational/linear speed) of the ride vehicle 10. The sphere controller 76 and/or the ride controller 84 may receive data indicative of the rotational speed of the sphere 14 and data indicative of the translational speed of the ride vehicle 10. Based on the received data, the sphere controller 76 and/or the ride controller 84 may determine the translational speed of the vehicle 10, the rotational speed of the sphere 14, and/or the tangential velocity of the external surface 55 of the sphere 14. Based on the determination, the sphere controller 76 and/or the ride controller 84 may send one or more drive signals to the sphere drive system 42 and/or the ride vehicle motor 68. Based on the received drive signals, the sphere drive system 42 and/or the ride vehicle motor 68 may adjust the rotation of the sphere 14 and/or the speed of the ride vehicle 10, respectively, such that the tangential speed of the external surface 55 of the sphere may substantially match the velocity of the ride vehicle 10 across the floor 51 of the attraction environment 12.

In some embodiments, one or more couplings 89 (e.g., sets of gears) may transfer rotational motion of the wheels 60 to drive the drive system 42. Indeed, a gear ratio of the one or more couplings 89 may be such that the tangential speed of the external surface 55 of the sphere 14, which may be a result of the drive system 42 driving the rotation of the sphere 14, substantially matches the speed of the ride vehicle 10, which may be the result of the ride vehicle motor 68 driving the wheels 60, through the attraction environment 12.

Further, a view angle 69 of the users 53 may be restricted such that the users 53 are prevented from viewing the base 16. That is, the users 53 may observe rotation of the sphere 14 while being obstructed from observing the base 16. Therefore, it may appear to the users 53 that the motive for movement of the ride vehicle 10 along the floor 51 of the attraction environment 12 may be the rotation of the sphere 14. Particularly, in some embodiments, the outer top surface 47 of the outer turntable 38 may obstruct the view angle 69 of the users 53 from overlapping with any portion of the base 16. Further, in some embodiments, a heads-up-display (HUD) 90 may similarly obstruct the view angle 69 of the users 53.

Figure 3:
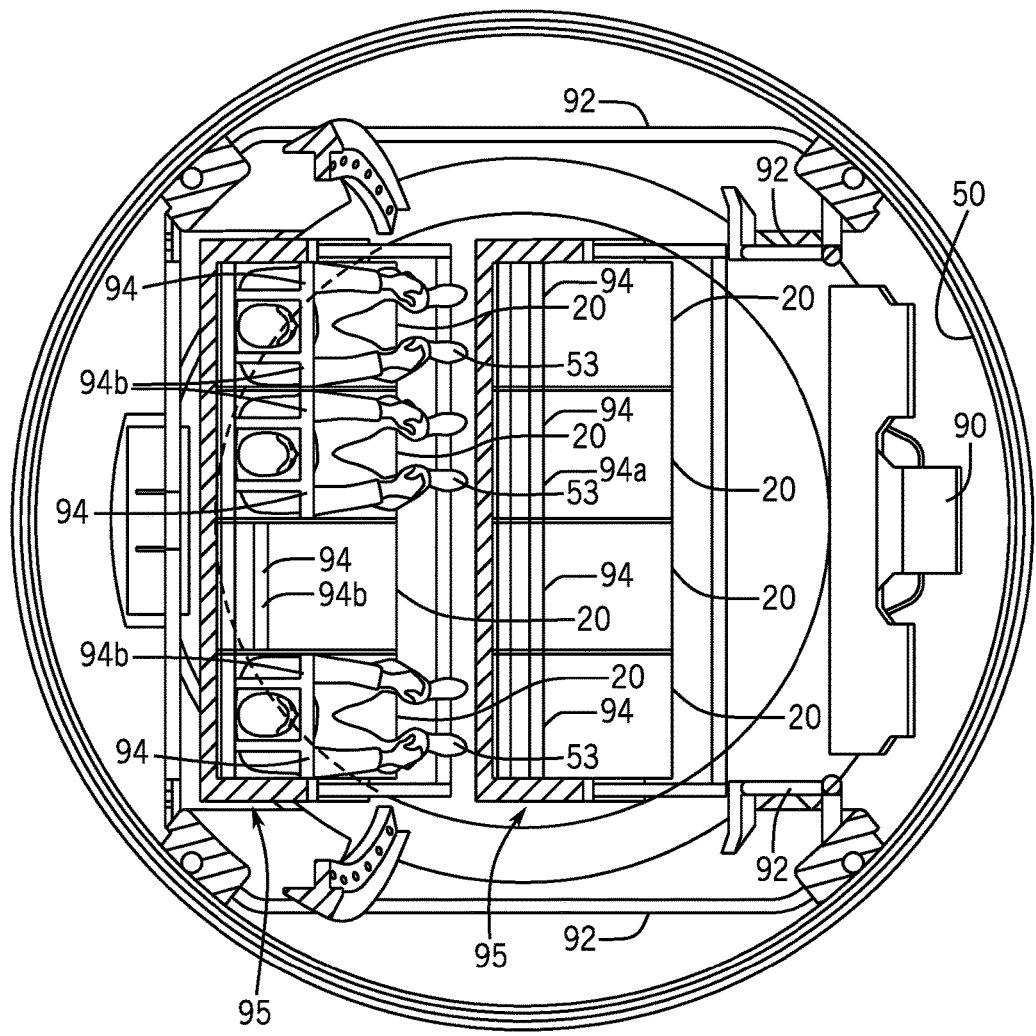
FIG. 3 is a cross sectional view of the ride vehicle of FIG. 1, in accordance with an embodiment.

As seen in FIG. 3, which is a cross-sectional vertical view of the ride vehicle 10, the HUD 90 may be disposed generally in front of the users 53. The HUD 90 may enhance the experience of the users 53 by displaying various images in accordance with the theme of the theme park ride 13. For example, the HUD 90 may communicate various messages to the users 53 such as warning messages indicating that the ride vehicle 10 is approaching a particular thematic element of the attraction environment 12. In certain embodiments, the HUD 90 may also show a static image such as a map of the attraction environment 12. In certain embodiments, the HUD 90 may also show a health (e.g., status) of the sphere 14 that may update based on the progress/location of the ride vehicle 10 in the attraction environment 12. Particularly, based on what is shown via the HUD 90, the users 53 may be presented with narrative information indicating that the sphere 14 is in good condition and/or may have one or more failing elements that could pose a pseudo-threat in accordance with the theme/narrative of the theme park ride 13. In some embodiments, the HUD 90 may display an image based on one or more signals received from the sphere controller 76 and/or the ride controller 84.

Further, the ride vehicle 10 may be sized such that it can comfortably accommodate a suitable number of seats 20 (and users 53). For example, in the current embodiment, the sphere 14 may be approximately ten to twelve feet in diameter with six to eight seats 20. Indeed, the sphere 14 may be sized to comfortably accommodate six to eight users 53 with a corresponding amount of seats 20. However, it should be understood that the ride vehicle 10 may be suitably sized to accommodate any suitable number of seats 20 and users 53.

The ride vehicle 10 may also include a rail 92 (e.g., hand rail, guard rail, etc.). The rail 92 may be disposed between the seats 20 and the internal surface 50 of the sphere 14. Particularly, the users 53 may grab onto the rail 92 while entering and/or exiting the ride vehicle 10. In some embodiments, the users 53 may also grab on to the rail 92 while the users 53 are secured within their respective seats 20 and the ride vehicle 10 is moving through the attraction environment 12. In some embodiments, the rail 92 may serve to block the users 53 from contacting the internal surface 50 of the sphere 14 when the sphere 14 is rotating. Further, while the sphere 14 is rotating, and more particularly, while the ride vehicle 10 is moving though the attraction environment 12, the users 53 may be secured to their seats 20 via restraints 94. In some embodiments, one restraint 94a may be provided for each row 95 of seats 20. In such embodiments, the restraints 94 may serve to keep the users 53 chaired within the seats 20 and to provide a handhold for the users 53 to grip. In some embodiments, each seat 20 may include a restraint 94b. In such embodiments, each restraint 94b may secure each user 53 to their respective seat 20 regardless of the orientation of the seats 20. For example, in such embodiments, the users 53 may rotate with the sphere 14 as described above, and as such, may be inverted or disposed at various angles. Accordingly, each user 53 may be secured comfortably to each of their respective seats 20 regardless of their orientation via the restraints 94b.

Figure 2:
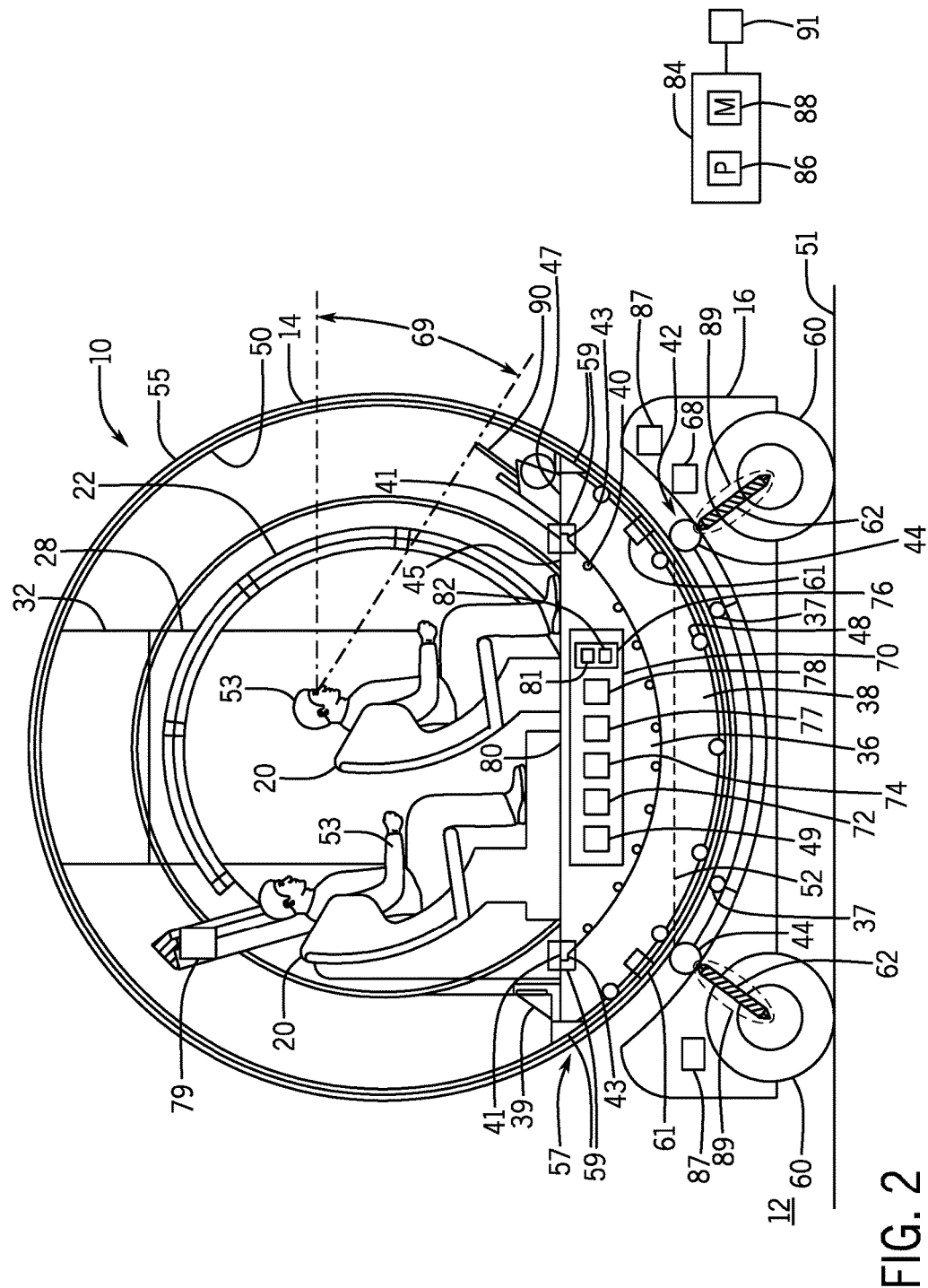
FIG. 2 is a cross sectional view of the ride vehicle of FIG. 1, in accordance with an embodiment.
Figure 4:
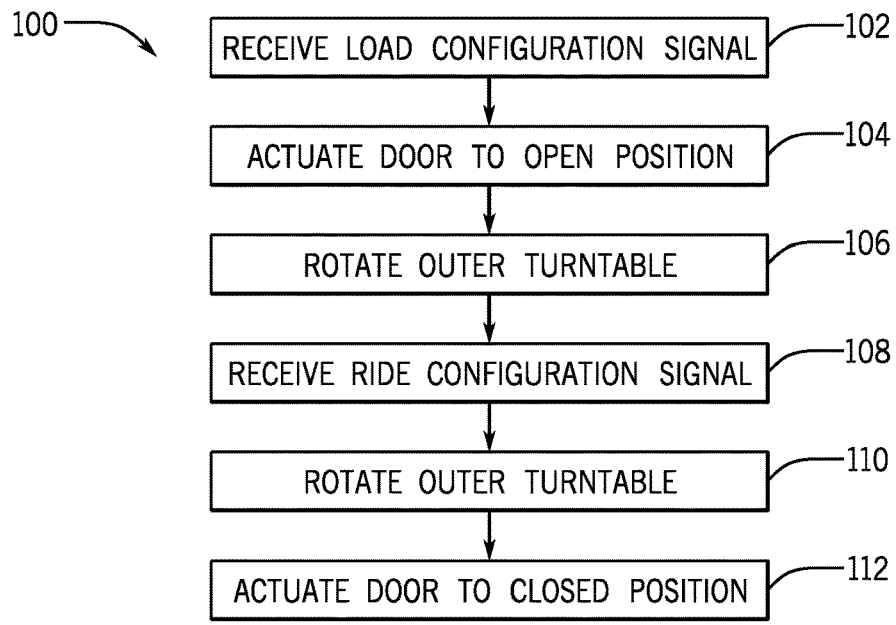
FIG. 4 is a flow diagram of one or more operations of the ride vehicle of FIG. 1, in accordance with an embodiment.

FIG. 4 is a flow diagram of a configuration operation 100 of the ride vehicle 10, discussed in conjunction with certain elements disclosed in FIGS. 1-3. At block 102, a controller (e.g., the sphere controller 76 and/or the ride controller 84) may receive a load configuration signal, which signals for the ride vehicle 10 to transition to a load configuration, thereby enabling users 53 to board to the ride vehicle 10. For example, a ride operator may press a button (e.g., via the input device 91) to send the load configuration signal to the controller. Upon receiving the load configuration signal, the controller may send a corresponding signal to actuate a door 28 of the ride vehicle 10 to an open position (block 104). Particularly, the door 28 may first move radially outward relative to the center of a sphere 14 of the ride vehicle 10. Once radially beyond a surface of the sphere 14 of the ride vehicle 10, the door 28 may move in a circumferential direction relative to the center of the sphere 14 of the ride vehicle 10 to reach the open position. Once the door 28 is in the open position, a portal 29, or doorway, through which users 53 may board the ride vehicle 10 is exposed.

Also upon receiving the load configuration signal, the controller may send a corresponding signal to a motor (e.g., turntable motor 49) to actuate an outer turntable 38 of the ride vehicle 10 (block 106). For example, the outer turntable 38 may include one or more theme elements 22, which may be coupled to and rotate with the outer turntable 38. Prior to receiving the load configuration signal, one or more of the theme elements 22 may be disposed in between the portal 29 of the sphere 14 and seats 20. After receiving the load configuration signal, the outer turntable 38 may be rotated such that the theme elements 22 are removed from a path between the portal 29 of the sphere 14 and the seats 20. For example, in some embodiments, the outer turntable 38 and the theme elements 22 may be rotated approximately ninety degrees to be removed from the path between the portal 29 of the sphere 14 and the seats 20. In some embodiments, as mentioned above, rotation of the outer turntable 38 and the theme elements 22 may be powered by the motor of the ride vehicle 10. Additionally, or in the alternative, rotation of the outer turntable 38 and the theme elements 22 may be manually powered (e.g., by a ride operator). Indeed, in some embodiments, the load configuration signal may include a first operator signaling to a second operator to manually rotate the outer turntable 38 and/or the theme elements 22. After the theme elements 22 have been rotated away from the path between the portal 29 of the sphere and the seats 20, users 53 may enter the sphere 14 to sit in respective seats 20. Further, it should be noted that portions of the configuration operation 100 as described in blocks 104 and 106 may occur simultaneously, and/or sequentially with either block 104 or block 106 occurring prior to the other.

At block 108, the controller may receive a ride configuration signal signaling for the ride vehicle 10 to transition to a ride configuration, thereby enabling the ride vehicle 10 to commence a ride cycle (e.g., travel through the attraction environment 12). For example, a ride operator may press a button (e.g., via the input device 91) to send the ride configuration signal to the controller after observing that all of the users 53 are seated in their respective seats 20 with restraints engaged. Upon receiving the ride configuration signal, the controller may send a corresponding signal to the motor to rotate the outer turntable 38 of the ride vehicle 10. Particularly, the outer turntable 38 may rotate (e.g., approximately ninety degrees) upon receiving the corresponding signal from the controller such that one or more of the theme elements 22 are disposed between the seats 20 of the ride vehicle 10 and the portal 29 of the ride vehicle 10 (block 110). Indeed, in some embodiments, the outer turntable 38 may be rotated manually by a ride operator. Specifically, an operator may manually rotate the outer turntable 38 and/or the theme elements 22.

Also upon receiving the ride configuration signal, the controller may send a corresponding signal to actuate the door 28 of the ride vehicle 10 to a closed position (block 112). Particularly, the door 28 may first move in a circumferential direction relative to the center of the sphere 14 towards the exposed portal 29. Once positioned radially above the doorway relative to the center of the sphere 14, the door 28 may transition radially inward relative to the center of the sphere 14 to cover the portal 29. Particularly, the door 28 may move to a position flush or substantially flush with the surface of the sphere 14. Further, it should be noted that portions of the configuration operation 100 as described in blocks 110 and 112 may occur simultaneously and/or sequentially with either block 110 or block 112 occurring prior to the other.

Figure 5A:
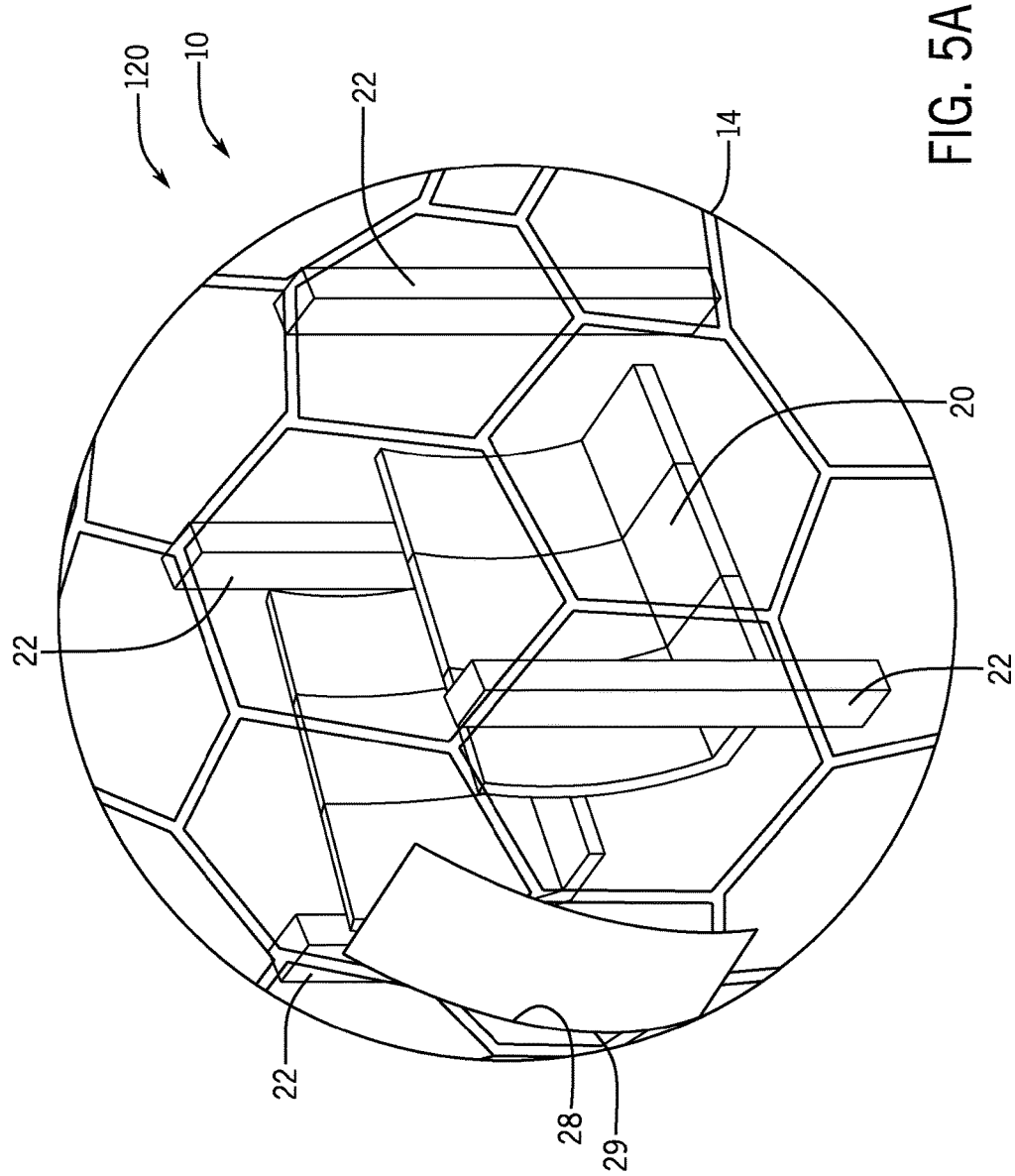
FIG. 5a is a perspective view of the ride vehicle of FIG. 1 in a ride configuration, in accordance with an embodiment.
Figure 5B:
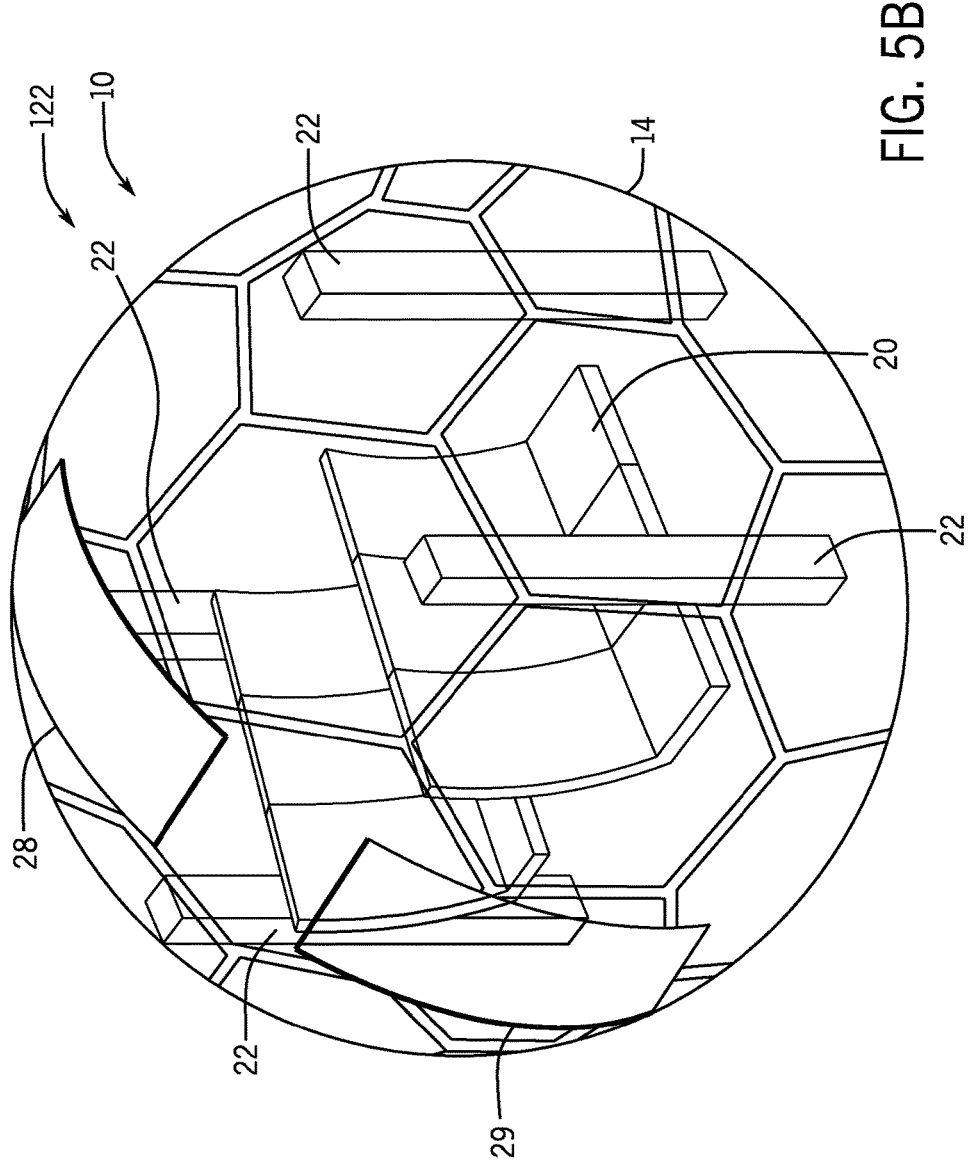
FIG. 5b is a perspective view of the ride vehicle of FIG. 1, in a load configuration, in accordance with an embodiment.

FIGS. 5a and 5b are perspective views of the sphere 14 of the ride vehicle 10 in a ride configuration 120 and in a load configuration 122, respectively. Indeed, in some embodiments, the configuration operation 100 of FIG. 4 discussed above may at least partially describe the transition of the ride vehicle 10 between the ride configuration 120 and the load configuration 122. For example, in the ride configuration 120, one or more of the theme elements 22 are disposed between the portal 29 and the seats 20. While in the ride configuration 120, the ride vehicle 10 may move through the attraction environment 12 of the theme park ride 13. However, in the load configuration 122, the theme elements 22 are not disposed between the portal 29 and the seats 20, and the door 28 has shifted to expose the portal 29. While in the load configuration 122, users may enter or exit the sphere 14 through the portal 29. In some embodiments, while the ride vehicle 10 is in the load configuration 122, the ride vehicle 10 may be prevented from moving through the attraction environment 12 (e.g., due to breaks being engaged).

Figure 6:
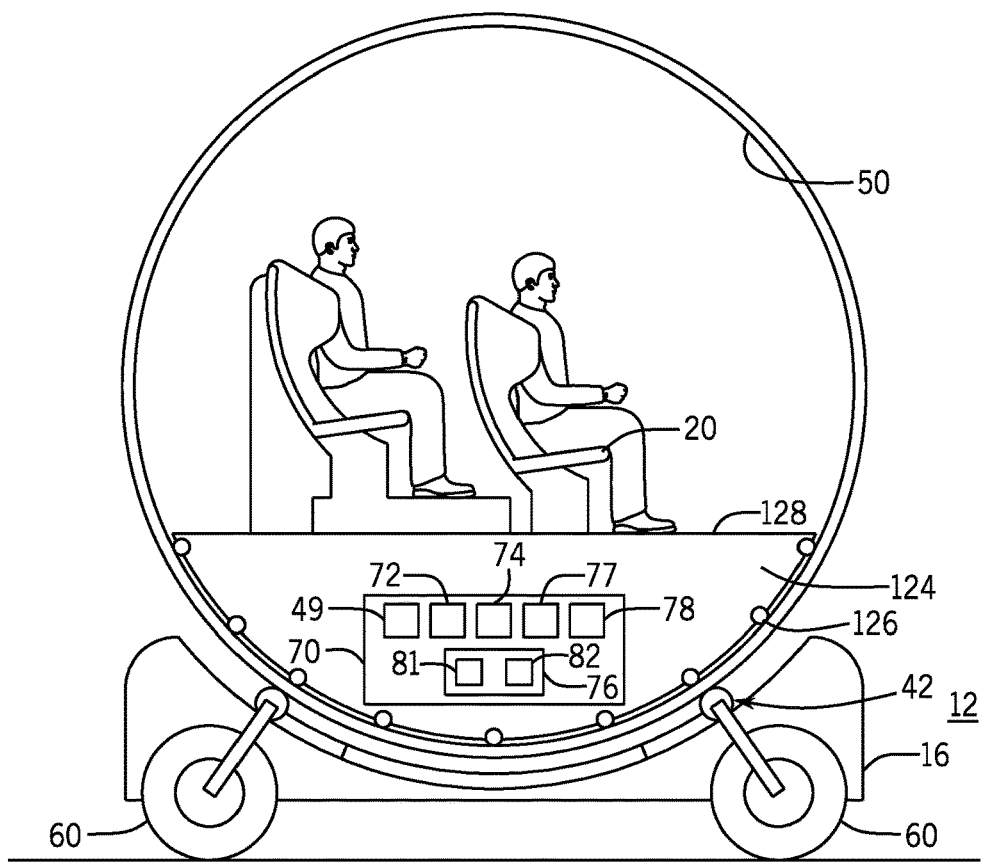
FIG. 6 is a cross sectional view of a ride vehicle, in accordance with an embodiment.

FIG. 6 is a cross-sectional side view of the ride vehicle 10, in accordance with an embodiment. In this embodiment, the ride vehicle 10 utilizes a unitary platform or turntable 124. Particularly, in the embodiment of FIG. 6, the ride vehicle 10 may be similar to embodiments described above with respect to FIGS. 1-5 except that, instead of having two separate turntables (e.g., the inner turntable 36 and the outer turntable 38) and the elements associated with having two separate turntables (e.g., the inner roller bearings 40 and the outer roller bearings 48), the ride vehicle 10 may include the unitary turntable 124 with a set of unitary roller bearings 126. For example, the unitary turntable 124 may support the seats 20 and the users 53 while the unitary roller bearings 126 interact with the internal surface 50 of the sphere 14. Indeed, similar to embodiments described above, the unitary roller bearings 126 may slide (e.g., roll) along the internal surface 50 of the sphere 14 such that rotational motion of the sphere 14 does not transfer to the unitary turntable 124. In this manner, the upper surface 128 of the unitary turntable 124 may remain substantially horizontal while the ride vehicle 10 is traversing through the attraction environment 12 and the sphere 14 is rotating. However, also as discussed above, in some embodiments, the ride vehicle 10 may include the locking system 57, which may provide for the unitary turntable 124 and the seats 20 to rotate in conjunction with the rotation of the sphere 14. Further, the unitary turntable 124 may be locked into position as a stationary platform.

Figure 7:
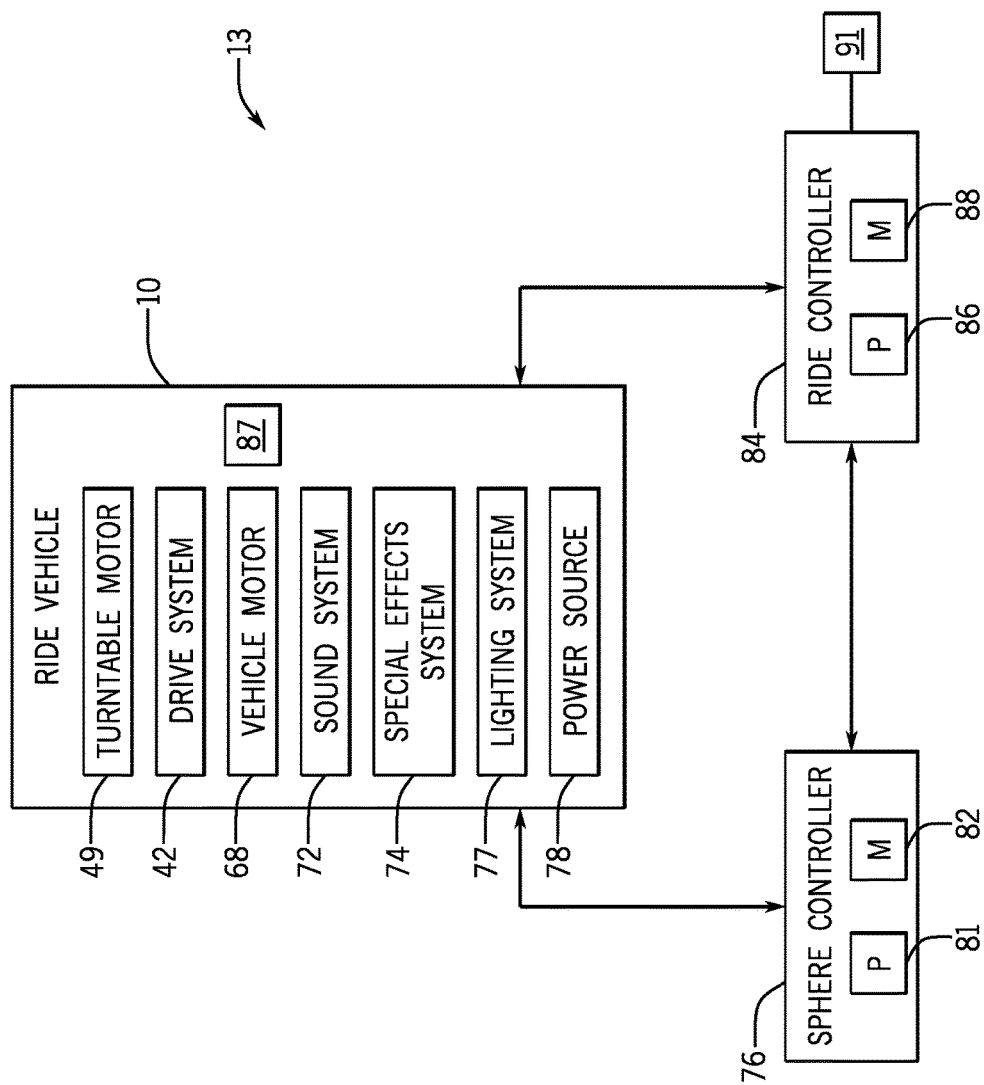
FIG. 7 is a block diagram of a theme park ride, which may include the ride vehicle of FIG. 1, in accordance with an embodiment.

FIG. 7 is a block diagram of the theme park ride 13, in accordance with an embodiment. As discussed above, the theme park ride 13 may include one or more ride vehicles 10, the sphere controller 76, which may be disposed within the ride vehicle 10, and the ride controller 84. Indeed, the sphere controller 76, the ride controller 84, and elements (e.g., systems) of the ride vehicle may be communicatively coupled with each other. For example, in some embodiments, the sphere controller 76, the ride controller 84, and the ride vehicle 10 may be communicatively coupled via a network, such as local area networks (LAN), wireless local area networks (WLAN), wireless wide area networks (WWAN), or near field communication (NFC). Further, in some embodiments, functions of the sphere controller 76 and the ride controller 84 may be carried out via a single controller. In such embodiments, the single controller may be located external to the ride vehicle 10 with the one or more input devices 91 configured to receive input from a ride operator.

While only certain features of present embodiments have been illustrated and described herein, many modifications and changes will occur to those skilled in the art. It is, therefore, to be understood that the appended claims are intended to cover all such modifications and changes that fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride vehicle, comprising:
   a base configured to move through an attraction environment;
   a sphere engaging the base and comprising one or more ride seats disposed within the sphere, wherein the one or more ride seats are coupled to an upper surface of a platform disposed within the sphere; and
   a sphere drive system of the base configured to engage with an external surface of the sphere to rotate the sphere relative to the base, wherein the upper surface of the platform is configured to maintain an orthogonal orientation relative to a vertical axis through a center of the base while the sphere drive system rotates the sphere about a non-vertical axis.

2. The ride vehicle of claim 1, wherein a bottom surface of the platform is contoured to conform to a contour of an internal surface of the sphere, and wherein the bottom surface of the platform comprises or is coupled to roller bearings configured to interact with the internal surface of the sphere.

3. The ride vehicle of claim 2, wherein the roller bearings are configured to move relative to the sphere when the sphere rotates.

4. The ride vehicle of claim 1, wherein the sphere comprises a plurality of panels coupled to a frame.

5. The ride vehicle of claim 1, wherein the platform comprises an inner turntable disposed at least partially within an outer turntable, wherein the inner turntable, the outer turntable, or both are configured to rotate relative to one another, and wherein the ride seats are coupled to the inner turntable and one or more theme elements are coupled to the outer turntable.

6. The ride vehicle of claim 1, wherein the platform comprises a housing configured to house a power source.

7. The ride vehicle of claim 1, wherein the base comprises a shock absorption system configured to reduce forces experienced by the sphere.

8. The ride vehicle of claim 1, wherein the platform comprises one or more turntables.

9. The ride vehicle of claim 1, comprising a locking system configured to be engaged to couple the platform to the sphere such that the platform is configured to rotate in conjunction with the sphere.

10. The ride vehicle of claim 1, comprising a heads-up-display (HUD) coupled to the platform and configured to display one or more images to one or more users within the one or more ride seats.

11. The ride vehicle of claim 1, comprising a controller configured to send one or more drive signals to the sphere drive system, and wherein the sphere drive system is configured to rotate the sphere such that the external surface of the sphere has a tangential speed substantially matching a speed of the base as it moves through the attraction environment based on the one or more drive signals.

12. A method, comprising:
    receiving a load configuration signal;
    actuating a door of a spherical cabin of a ride vehicle to an open position based on the received load configuration signal;
    rotating an outer turntable of a platform relative to an inner turntable of the platform based on the received load configuration signal, wherein the platform is disposed within the spherical cabin;
    receiving one or more passengers within the spherical cabin of the ride vehicle after receiving the load configuration signal;
    receiving a ride configuration signal;
    rotating the outer turntable relative to the inner turntable based on the received ride configuration signal; and
    actuating the door of the ride vehicle to a closed position based on the received ride configuration signal.

13. The method of claim 12, comprising locking the outer turntable and the inner turntable together after actuating the door of the ride vehicle.

14. The method of claim 12, wherein the door is configured to form a portion of the spherical cabin of the ride vehicle, and wherein actuating the door to the open position comprises:
    moving the door radially beyond a surface of the sphere; and
    moving the door circumferentially relative to the sphere.

15. The method of claim 12, comprising receiving a signal to cause the sphere to rotate relative to the outer turntable.

16. A ride vehicle comprising:
    a sphere cabin configured to be rotated by a sphere drive system, wherein the sphere drive system comprises a plurality of drivers configured to transfer rotational motion to the sphere cabin such that the sphere cabin is capable of being rotated in all directions about its center;
    one or more platforms configured to support one or more users within the sphere cabin, wherein the sphere cabin is configured to rotate relative to the one or more platforms;
    a base having the sphere drive system; and one or more ride seats coupled to the one or more platforms and configured to support the one or more users, wherein the one or more platforms and the one or more ride seats are configured to maintain an orientation relative to the base and to a vertical axis through a center of the base during rotation of the sphere cabin about a non-vertical axis.

17. The ride vehicle of claim 16, wherein the one or more platforms comprises:

a power source configured to power one or more operations of the ride vehicle, a motor, a sound system, a special effects system, a controller, or a combination thereof.

18. The ride vehicle of claim 16, wherein an upper surface of the one or more platforms is configured to remain substantially horizontal during the rotation of the sphere cabin.

19. The ride vehicle of claim 16, wherein each driver of the plurality of drivers is configured to be rotated via a spherical induction motor.

20. The ride vehicle of claim 16, comprising:

a base configured to support the sphere cabin, wherein the base comprises one or more motors configured to actuate a plurality of wheels to drive the ride vehicle through an environment.

21. The ride vehicle of claim 16, wherein the one or more platforms comprises an inner turntable disposed at least partially within an outer turntable, and wherein the inner turntable, the outer turntable, or both are configured to rotate relative to one another.

22. A ride vehicle, comprising:

a base configured to move through an attraction environment;

a sphere engaging the base and comprising one or more ride seats disposed within the sphere, wherein the one or more ride seats are coupled to an upper surface of a platform disposed within the sphere; and a sphere drive system of the base configured to engage with an external surface of the sphere to rotate the sphere relative to the base, wherein the upper surface of the platform is configured to remain substantially horizontal while the sphere drive system rotates the sphere, and wherein the sphere comprises a plurality of panels coupled to a frame.

23. The ride vehicle of claim 22, wherein the platform comprises one or more turntables.

* * * * *